United States Patent
Von Borstel et al.

(10) Patent No.: US 10,348,877 B1
(45) Date of Patent: Jul. 9, 2019

(54) SMARTPHONE DASHBOARD MOUNT ASSEMBLY

(71) Applicants: Jose A. Von Borstel, Riverside, CA (US); Paula Von Borstel, Riverside, CA (US)

(72) Inventors: Jose A. Von Borstel, Riverside, CA (US); Paula Von Borstel, Riverside, CA (US)

( * ) Notice: Subject to any disclaimer, the term of this patent is extended or adjusted under 35 U.S.C. 154(b) by 0 days.

(21) Appl. No.: 16/127,759

(22) Filed: Sep. 11, 2018

(51) Int. Cl.
| | |
|---|---|
| *H04M 1/04* | (2006.01) |
| *H04R 1/02* | (2006.01) |
| *B60K 35/00* | (2006.01) |
| *B60K 37/00* | (2006.01) |

(52) U.S. Cl.
CPC ............... *H04M 1/04* (2013.01); *B60K 35/00* (2013.01); *B60K 37/00* (2013.01); *H04R 1/028* (2013.01); *B60K 2350/941* (2013.01)

(58) Field of Classification Search
CPC ......... H04M 1/04; B60K 35/00; B60K 37/00; B60K 2350/941
See application file for complete search history.

(56) References Cited

U.S. PATENT DOCUMENTS

| | | | |
|---|---|---|---|
| 4,846,382 A | 7/1989 | Foultner | |
| 5,529,271 A | 6/1996 | Dunchock | |
| 6,246,766 B1 | 6/2001 | Walsh | |
| 6,491,194 B2 | 12/2002 | Marvin | |
| 7,062,300 B1 | 6/2006 | Kim | |
| D676,371 S | 2/2013 | Son | |
| D716,215 S | 10/2014 | Dunn | |
| 2007/0254695 A1* | 11/2007 | Langberg | G06F 1/1632 455/556.1 |
| 2009/0152428 A1* | 6/2009 | Cilia | B60R 11/02 248/346.03 |
| 2011/0024470 A1 | 2/2011 | Hajarian | |
| 2011/0143583 A1* | 6/2011 | Zilmer | H04M 1/04 439/529 |
| 2018/0341289 A1* | 11/2018 | Schachter | G06F 1/1632 |

* cited by examiner

*Primary Examiner* — Nguyen T Vo

(57) ABSTRACT

A smartphone dashboard mount assembly for mounting a smartphone on a dashboard of a vehicle includes a vehicle that has a dashboard and an electronic device that has a display. A mount is removably retained on the dashboard and the electronic device is removably retained on the mount has the display being exposed. Thus, the display is visible to a driver without requiring the driver to look away from the road while driving. A communication unit is coupled to the mount and the communication unit is in wireless electrical communication with the electronic device. The communication unit receives an audio signal from the electronic device thereby emitting audible sound corresponding to the audio signal.

5 Claims, 5 Drawing Sheets

SMARTPHONE DASHBOARD MOUNT ASSEMBLY

The disclosure and prior art relates to smartphone mount devices and more particularly pertains to a new smartphone mount device for mounting a smartphone on a dashboard of a vehicle.

BRIEF SUMMARY OF THE INVENTION

An embodiment of the disclosure meets the needs presented above by generally comprising There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
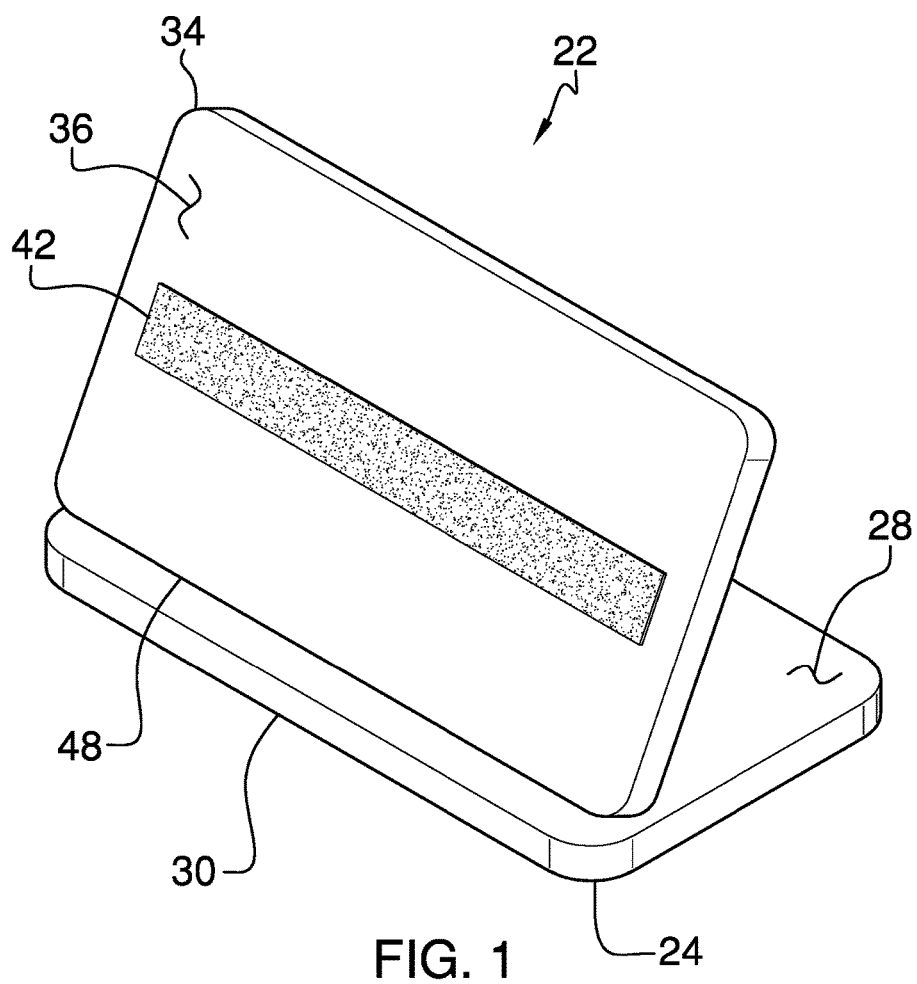
FIG. 1 is a front perspective view of a smartphone dashboard mount assembly according to an embodiment of the disclosure.
Figure 2:
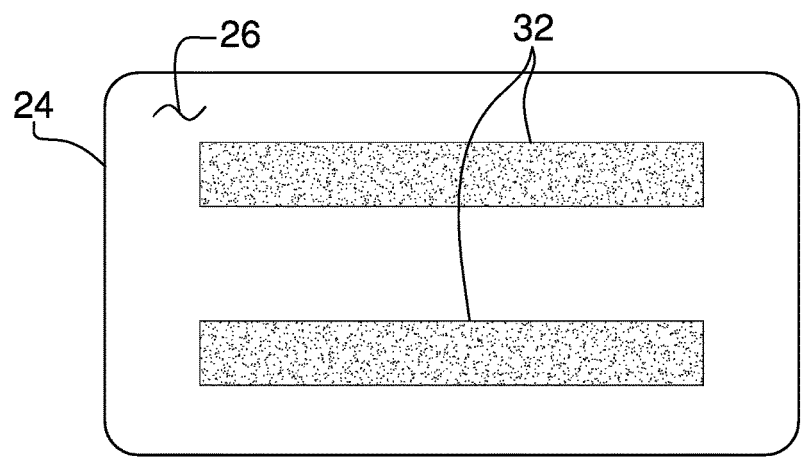
FIG. 2 is a bottom view of an embodiment of the disclosure.
Figure 3:
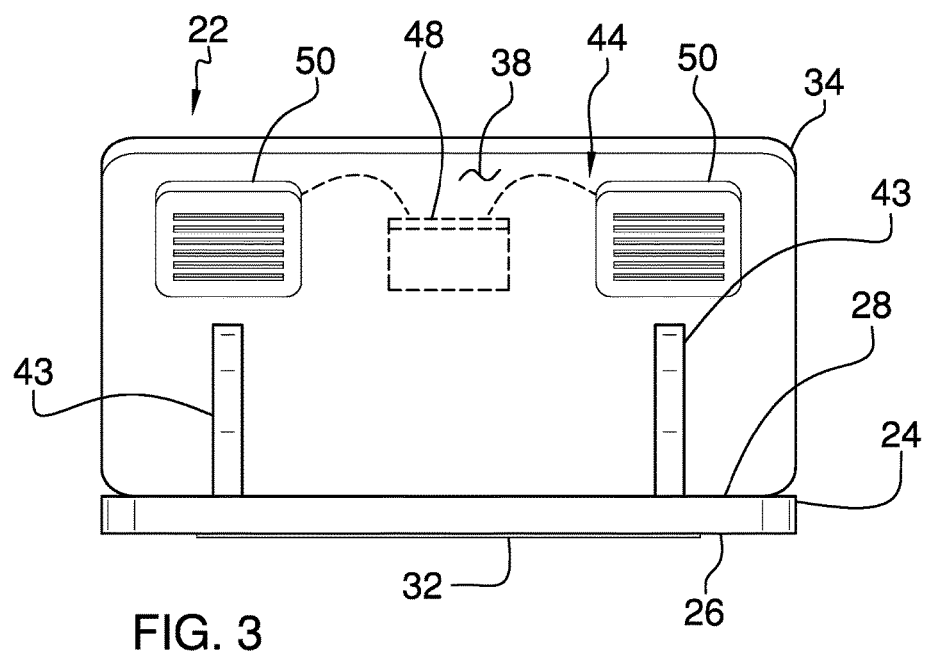
FIG. 3 is a back view of an embodiment of the disclosure.
Figure 4:
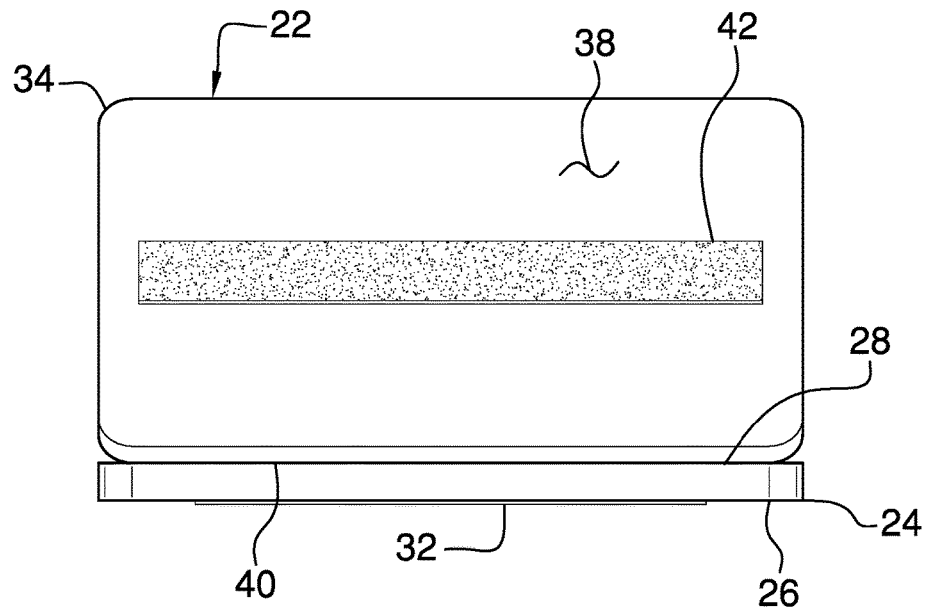
FIG. 4 is a front view of an embodiment of the disclosure.
Figure 5:
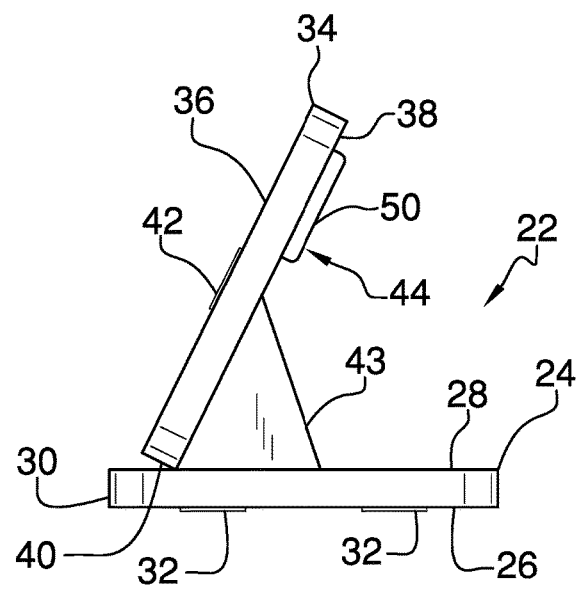
FIG. 5 is a left side view of an embodiment of the disclosure.
Figure 6:
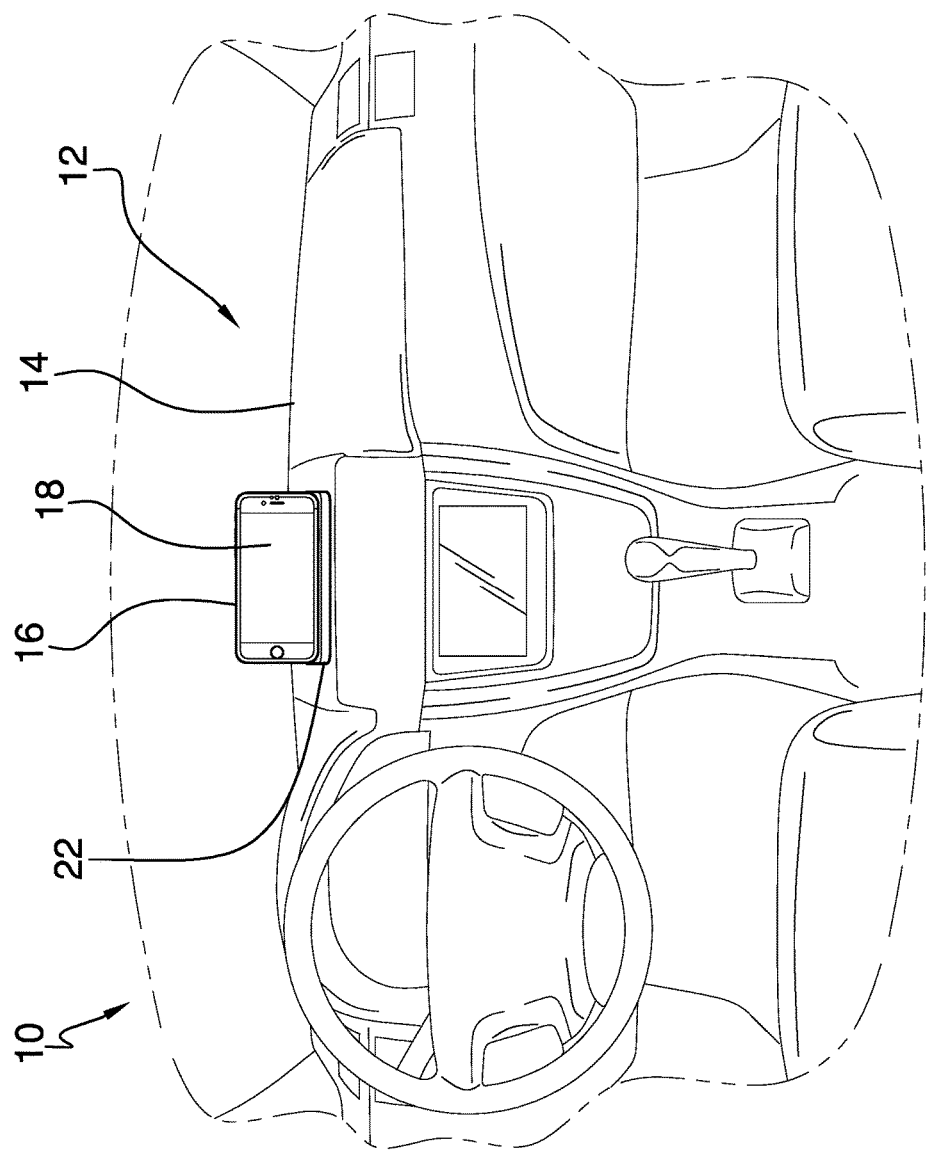
FIG. 6 is a perspective in-use view of an embodiment of the disclosure.
Figure 7:
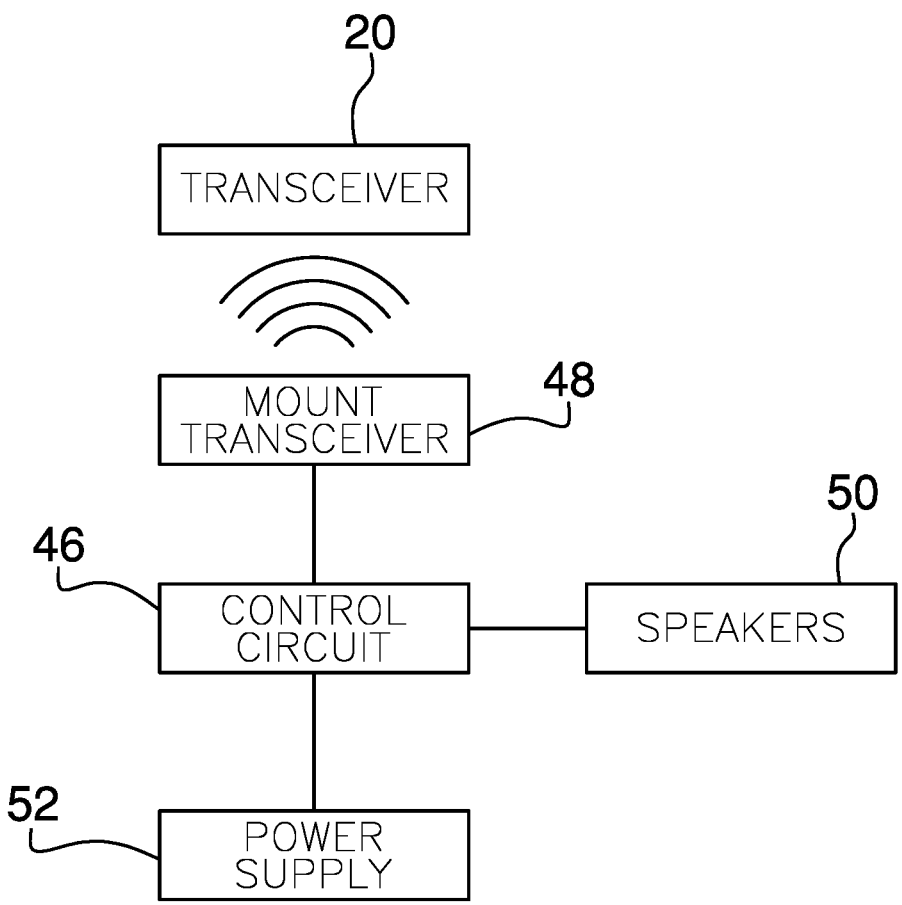
FIG. 7 is a schematic view of an embodiment of the disclosure.

With reference now to the drawings, and in particular to FIGS. 1 through 7 thereof, a new smartphone mount device embodying the principles and concepts of an embodiment of the disclosure and generally designated by the reference numeral 10 will be described.

As best illustrated in FIGS. 1 through 7, the smartphone dashboard mount assembly 10 generally comprises a vehicle 12 that has a dashboard 14. The vehicle 12 may be a passenger vehicle 12 such as a car, a cargo vehicle such as a truck and any other motorized vehicle with a dashboard. An electronic device 16 is provided that has a display 18 and a transceiver 20. The electronic device 16 may be a smart phone or other similarly sized electronic device 16.

A mount 22 is provided and the mount 22 is removably retained on the dashboard 14. The electronic device 16 is removably retained on the mount 22 having the display 18 being exposed. In this way the display 18 is visible to a driver without requiring the driver to look away from the road while driving. The mount 22 comprises a bottom panel 24 that has a bottom surface 26, a top surface 28 and a front edge 30. The bottom panel 24 is positioned on the dashboard 14 having the bottom surface 26 abutting the dashboard 14.

A bottom mating member 32 is coupled to the bottom panel 24 and the bottom mating member 32 is positioned on the bottom surface 26. The bottom mating member 32 releasably engages the dashboard 14 to retain the bottom panel 24 on the dashboard 14. The bottom mating member 32 may comprise a hook and loop fastener, a strap or any other type of releasable mating member.

The mount 22 includes a top panel 34 that has a front surface 36, a back surface 38 and a bottom edge 40. The bottom edge 40 is positioned on the top surface 28 of the bottom panel 24 having the top panel 34 extending up from the bottom panel 24 such that the front surface 36 faces the driver. A top mating member 42 is coupled to the top panel 34 and the top mating member 42 is positioned on the front surface 36. The top mating member 42 releasably engages the electronic device 16 to retain the electronic device 16 on the top panel 34. Additionally, the top mating member 42 may comprise a hook and loop fastener, a strap or any other type of releasable fastener.

The mount 22 further includes a pair of supports 43. Each of the supports 43 is coupled between the back surface 38 of the top panel 34 and the top surface 28 of the bottom panel 24. Each of the supports 43 retains the top panel 34 at a rearwardly leaning angle on the bottom panel 24. The supports 43 may comprise angled gussets or other type of structural member.

A communication unit 44 is coupled to the mount 22 and the communication unit 44 is in wireless electrical communication with the electronic device 16. Thus, the communication unit 44 can receive an audio signal from the electronic device 16. The communication unit 44 emits audible sound corresponding to the audio signal.

The communication unit 44 comprises a control circuit 46 that is coupled to the mount 22 and a mount transceiver 48 that is coupled to the mount 22. The mount transceiver 48 is electrically coupled to the control circuit 46 and the mount transceiver 48 is in electrical communication with the transceiver 20 in the electronic device 16. Thus, the mount transceiver 48 receives the audio signal from the electronic device 16. The mount transceiver 48 may be a radio frequency transceiver 20 or the like and the mount transceiver 48 may employ a WPAN signal and Bluetooth communication protocols.

A pair of speakers 50 is each coupled to the top panel 34 for emitting audible sound outwardly therefrom. Each of the speakers 50 is electrically coupled to the control circuit 46 and each of the speakers 50 may be electronic speakers 50 of any conventional design. A power supply 52 is coupled to the mount 22, the power supply 52 is electrically coupled to the control circuit 46 and the power supply 52 comprises at least one battery. Alternatively, the communication unit 44 may be absent from the mount 22.

In use, the bottom panel 24 is positioned at a selected location on the dashboard 14 such that the front surface 36 of the top panel 34 is visible from seats in the vehicle 12. The electronic device 16 is positioned against the front surface 36 of the top panel 34 thereby facilitating the display 18 on the electronic device 16 to be visible. In this way the display 18 can be observed for gps navigation or other purposes without requiring the driver of the vehicle 12 to look away from the road while driving the vehicle 12. In this way the mount 22 enhances the safety of the driver with respect to minimizing distractions during driving. The mount transceiver 48 can by synched with the transceiver 20 in the electronic device 16 for emitting audible sound outwardly from the speakers 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A smartphone dashboard mount assembly for mounting a smartphone on a dashboard of a vehicle, said assembly comprising:
   a vehicle having a dashboard;
   an electronic device having a display and a transceiver;
   a mount being removably retained on said dashboard, said electronic device being removably retained on said mount having said display being exposed wherein said display is configured to be visible to a driver without requiring the driver to look away from the road while driving, said mount comprises
      a bottom panel, said bottom panel being planar, rectangular, and having a bottom surface, a top surface and a front edge, said front edge being a long side of said bottom panel, said bottom panel being positioned on said dashboard having said bottom surface abutting said dashboard,
      a top panel, said top panel being planar, rectangular, and having a front surface, a back surface and a bottom edge, said bottom edge being a longitudinal side of said top panel, said bottom edge being positioned on said top surface of said bottom panel inwardly offset from said front edge of said bottom panel and having said top panel extending up from said bottom panel and away from said front edge of said bottom panel having said front surface facing the driver, and
      a pair of supports, each of said supports being coupled between said back surface of said top panel and said top surface of said bottom panel, each of said supports retaining said top panel at a rearwardly leaning angle on said bottom panel; and
   a communication unit being coupled to said mount, said communication unit being in wireless electrical communication with said electronic device for receiving an audio signal from said electronic device, said communication unit emitting audible sound corresponding to said audio signal.

2. The assembly according to claim 1, further comprising:
   a top mating member being coupled to said top panel, said top mating member being positioned on said front surface, said top mating member releasably engaging said electronic device to retain said electronic device on said top panel; and
   a bottom mating member being coupled to said bottom panel, said bottom mating member being positioned on said bottom surface, said bottom mating member releasably engaging said dashboard to retain said bottom panel on said dashboard.

3. The assembly according to claim 1, wherein said communication unit comprises:
   a control circuit being coupled to said mount; and
   a mount transceiver being coupled to said mount, said mount transceiver being electrically coupled to said control circuit, said mount transceiver being in electrical communication with said transceiver in said electronic device for receiving the audio signal from said electronic device.

4. The assembly according to claim 3, wherein said communication unit includes:
   a pair of speakers, each of said speakers being coupled to said top panel for emitting audible sound outwardly therefrom, each of said speakers being electrically coupled to said control circuit; and
   a power supply being coupled to said mount, said power supply being electrically coupled to said control circuit, said power supply comprising at least one battery.

5. A smartphone dashboard mount assembly for mounting a smartphone on a dashboard of a vehicle, said assembly comprising:
   a vehicle having a dashboard;
   an electronic device having a display and a transceiver; a
   a mount being removably retained on said dashboard, said electronic device being removably retained on said mount having said display being exposed wherein said display is configured to be visible to a driver without requiring the driver to look away from the road while driving, said mount comprising:
      a bottom panel, said bottom panel being planar, rectangular and having a bottom surface, a top surface and a front edge, said front edge being a long side of said bottom panel, said bottom panel being positioned on said dashboard having said bottom surface abutting said dashboard;
      a bottom mating member being coupled to said bottom panel, said bottom mating member being positioned on said bottom surface, said bottom mating member releasably engaging said dashboard to retain said bottom panel on said dashboard;
      a top panel, said top panel being planar, rectangular, and having a front surface, a back surface and a bottom edge, said bottom edge being a longitudinal side of said top panel, said bottom edge being positioned on said top surface of said bottom panel inwardly offset from said front edge of said bottom panel and having said top panel extending up from said bottom panel and away from said front edge of said bottom panel having said front surface facing the driver;
      a top mating member being coupled to said top panel, said top mating member being positioned on said front surface, said top mating member releasably engaging said electronic device to retain said electronic device on said top panel; and a pair of supports, each of said supports being coupled between said back surface of said top panel and said top surface of said bottom panel, each of said supports retaining said top panel at a rearwardly leaning angle on said bottom panel; and a communication unit being coupled to said mount, said communication unit being in wireless electrical communication with said electronic device for receiving an audio signal from said electronic device, said communication unit emitting audible sound corresponding to said audio signal, said communication unit comprising:

a control circuit being coupled to said mount;

a mount transceiver being coupled to said mount, said mount transceiver being electrically coupled to said control circuit, said mount transceiver being in electrical communication with said transceiver in said electronic device for receiving the audio signal from said electronic device;

a pair of speakers, each of said speakers being coupled to said top panel for emitting audible sound outwardly therefrom, each of said speakers being electrically coupled to said control circuit; and a power supply being coupled to said mount, said power supply being electrically coupled to said control circuit, said power supply comprising at least one battery.

* * * * *